(12) United States Patent
Nakamura et al.

(10) Patent No.: US 11,522,215 B2
(45) Date of Patent: Dec. 6, 2022

(54) ALL-SOLID-STATE BATTERY PRODUCTION METHOD AND ALL-SOLID-STATE BATTERY

(71) Applicant: Toyota Jidosha Kabushiki Kaisha, Toyota (JP)

(72) Inventors: Kota Nakamura, Toyota (JP); Hideki Asadachi, Toyota (JP); Norihiro Ose, Shizuoka-ken (JP); Yoshihide Enomoto, Nagakute (JP); Tomoya Suzuki, Seto (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 205 days.

(21) Appl. No.: 16/823,804

(22) Filed: Mar. 19, 2020

(65) Prior Publication Data

US 2020/0303770 A1 Sep. 24, 2020

(30) Foreign Application Priority Data

Mar. 22, 2019 (JP) .............................. JP2019-055155
Oct. 31, 2019 (JP) .............................. JP2019-199097

(51) Int. Cl.
*H01M 10/058* (2010.01)
*H01M 10/0562* (2010.01)
(Continued)

(52) U.S. Cl.
CPC ..... *H01M 10/0562* (2013.01); *H01M 4/0435* (2013.01); *H01M 4/485* (2013.01); *H01M 2004/027* (2013.01); *H01M 2004/028* (2013.01)

(58) Field of Classification Search
None
See application file for complete search history.

(56) References Cited

U.S. PATENT DOCUMENTS

2013/0337320 A1* 12/2013 Yukawa ................ H01M 4/049
429/211
2016/0365574 A1* 12/2016 Kim ...................... H01M 4/624
(Continued)

FOREIGN PATENT DOCUMENTS

JP 2008/021556 * 1/2008 ............ H01M 10/05
JP 2008-021556 A 1/2008
(Continued)

OTHER PUBLICATIONS

English translation of JP 2008/021556 (Year: 2008).*

*Primary Examiner* — Yoshitoshi Takeuchi
(74) *Attorney, Agent, or Firm* — Dinsmore & Shohl LLP

(57) ABSTRACT

To provide a method for production of an all-solid-state battery in which cracking of the ends of the electrodes can be suppressed even if a negative electrode active material layer including lithium-titanium oxide is roll-pressed, provided is a method for the production of an all-solid-state battery, including roll-pressing to consolidate a negative electrode active material layer; wherein the all-solid-state battery has a structure including a laminate of a positive electrode current collector layer, a positive electrode active material layer, a solid electrolyte layer, the negative electrode active material layer, and a negative electrode current collector layer in this order, the negative electrode active material layer includes a lithium-titanium oxide as a negative electrode active material, and prior to the roll-pressing, a stress relaxation rate of the negative electrode active material layer is 32.5% or more.

4 Claims, 5 Drawing Sheets

(51) Int. Cl.
*H01M 4/485* (2010.01)
*H01M 4/04* (2006.01)
*H01M 4/02* (2006.01)

(56) References Cited

U.S. PATENT DOCUMENTS

| | | | |
|---|---|---|---|
| 2017/0062798 A1* | 3/2017 | Wang | H01M 4/0419 |
| 2017/0092988 A1* | 3/2017 | Haga | H01M 10/0585 |
| 2017/0256781 A1* | 9/2017 | Suzuki | H01M 4/139 |
| 2018/0219254 A1* | 8/2018 | Tamura | H01M 50/409 |
| 2018/0277908 A1 | 9/2018 | Sasakawa et al. | |

FOREIGN PATENT DOCUMENTS

| | | |
|---|---|---|
| JP | 2013-033655 A | 2/2013 |
| JP | 2017-033722 A | 2/2017 |
| JP | 2018-160444 A | 10/2018 |

* cited by examiner

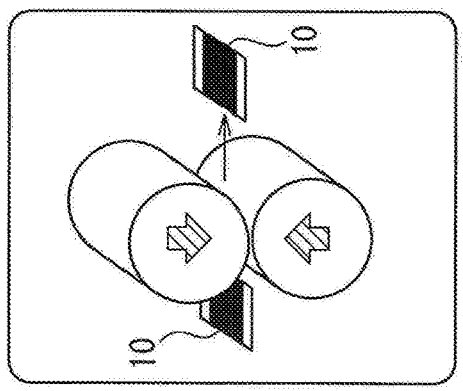
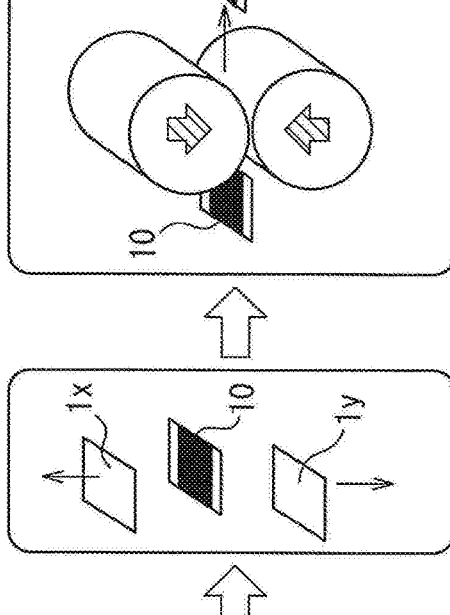
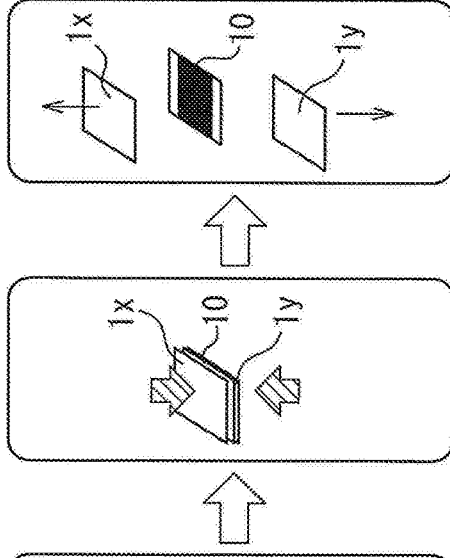
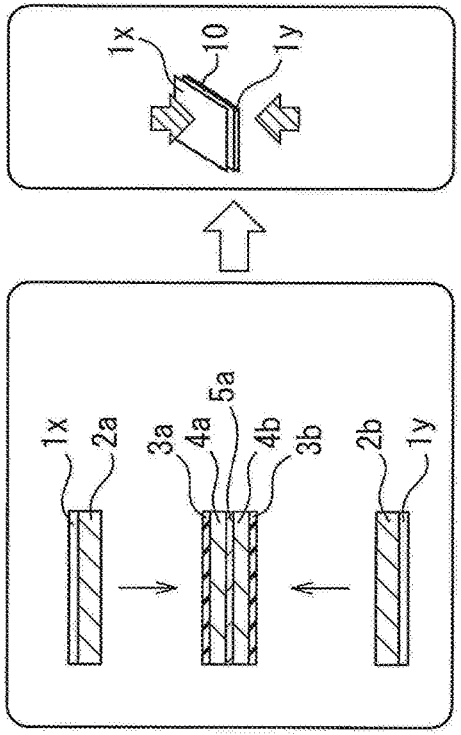
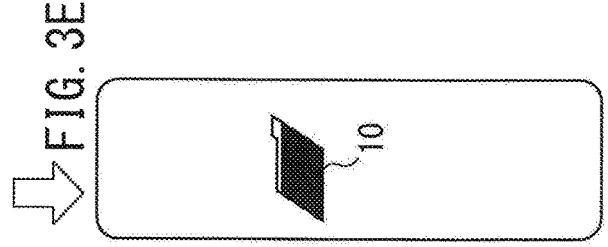
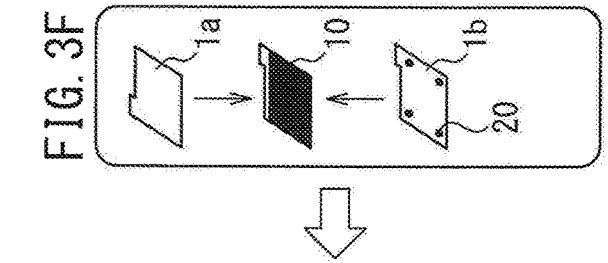
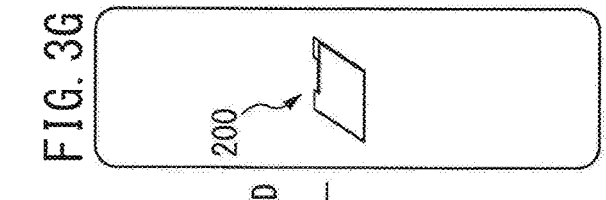
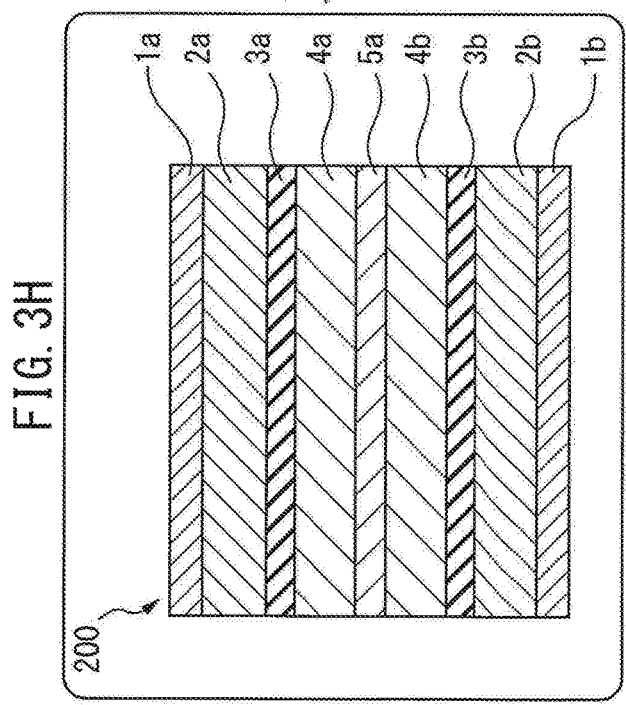

ALL-SOLID-STATE BATTERY PRODUCTION METHOD AND ALL-SOLID-STATE BATTERY

CROSS REFERENCE TO RELATED APPLICATION

The present application claims priority to Japanese Patent Application No. 2019-055155 filed on Mar. 22, 2019, and to Japanese Patent Application No. 2019-199097 filed on Oct. 31, 2019, the entire contents of both of which are hereby incorporated by reference into this application.

FIELD

The present disclosure relates to an all-solid-state battery production method. In particular, the present disclosure relates to a method for the production of an all-solid-state battery including a negative electrode active material layer including a lithium-titanium oxide as a negative electrode active material.

BACKGROUND

In recent years, attention has been paid to all-solid-state batteries having a structure including a laminate of a positive electrode current collector layer, a positive electrode active material layer, a solid electrolyte layer, a negative electrode active material layer, and a negative electrode current collector layer in this order as the power sources of mobile devices, automobiles, etc. Among these, attention has been paid to the use of lithium-titanium oxides (also referred to as "lithium titanates" or "LTO") as the negative electrode active material included in the negative electrode active material layer.

For example, Patent Literature 1 discloses an all-solid-state battery containing a positive electrode layer including a positive electrode material, a negative electrode layer including a negative electrode material, and a solid electrolyte layer disposed between the positive electrode layer and the negative electrode layer, wherein the solid electrolyte layer is composed of an oxide-based solid electrolyte material, a sulfide-based solid electrolyte material is exposed on a surface of at least one of the positive electrode layer and the negative electrode layer on a side in contact with the solid electrolyte layer, the sulfide-based solid electrolyte material constitutes at least a part of the interface between the electrode layer on which it is exposed and the solid electrolyte layer, and when the surface area of the entire region of the interface is defined as S0, and the surface area of the partial region of the interface in which the sulfide-based solid electrolyte material is exposed is set as S1, the expression S1/S0≥0.01 is satisfied. Furthermore, Patent Literature 1 discloses that the lithium titanate $Li_4Ti_5O_{12}$ is used in the all-solid-state battery as the negative electrode active material.

Patent Literature 2 discloses a lithium secondary battery having a capacity of 5 Ah or more composed of a positive electrode including a positive electrode active material, a conductive material, a binder, and a current collector, a negative electrode including a negative electrode active material, a conductive material, and a current collector, a separator which electrically insulates the positive electrode and the negative electrode, and an electrolyte including an electrolyte salt. Patent Literature 2 further discloses that the negative electrode active material is the spinel-structure lithium titanate $Li_4Ti_5O_{12}$.

Patent Literature 3 discloses a battery containing a positive electrode, a negative electrode, and an electrolyte layer including a negative electrode active material. Patent Literature 3 further discloses that the negative electrode active material includes at least one of a carbon material, silicon (Si), tin (Sn), and a lithium titanate.

Patent Literature 4 discloses a secondary battery containing a negative electrode active material-containing layer, a positive electrode active material-containing layer, and an insulation layer including insulating particles and disposed between the negative electrode active material-containing layer and the positive electrode active material-containing layer, wherein the particle size distribution of the insulating particles in the insulation layer has two or more peaks. Patent Literature 4 further discloses that the negative electrode active material-containing layer may include a spinel-type lithium titanate.

CITATION LIST

Patent Literature

[PTL 1] Japanese Unexamined Patent Publication No. 2013-033655
[PTL 2] Japanese Unexamined Patent Publication No. 2008-021556
[PTL 3] Japanese Unexamined Patent Publication No. 2017-033722
[PTL 4] Japanese Unexamined Patent Publication No. 2018-160444

SUMMARY

Technical Problem

When producing an all-solid-state battery, pressing may be employed to consolidate the positive electrode active material layer, the negative electrode active material layer, and the solid electrolyte layer.

Furthermore, from the viewpoint of continuous production and strengthening the consolidation of the active material layer, solid electrolyte layer, etc., when pressing the positive electrode active material layer, the negative electrode active material layer, and the solid electrolyte layer, roll-pressing is known to be more efficient than planar-pressing.

However, according to the rigorous investigation of the present inventors, it has been found that, depending on the type of negative electrode active material, when the negative electrode active material layer is consolidated by roll-pressing, there is a problem in that cracking of the ends of the electrodes may occur. In particular, it has been discovered that when a negative electrode active material layer including a lithium-titanium oxide is roll-pressed, cracking is likely to occur in the ends thereof.

In consideration of the foregoing, a technology with which cracking of the ends of the electrode can be suppressed when a negative electrode active material layer including a lithium-titanium oxide is roll-pressed during production of an all-solid-state battery is needed.

Solution to Problem

As a means for solving the above problems, the present application discloses:
a production method of an all-solid-state battery, including roll-pressing to consolidate a negative electrode active material layer, wherein the all-solid-state battery has a structure including a laminate of a positive electrode current collector layer, a positive electrode active material layer, a solid electrolyte layer, the negative electrode active material layer, and a negative electrode current collector layer in this order, the negative electrode active material layer includes a lithium-titanium oxide as a negative electrode active material, and prior to (before) the roll-pressing, a stress relaxation rate of the negative electrode active material layer is 32.5% or more.

As a means for solving the above problems, the present application discloses:

a production method of an all-solid-state battery, including roll-pressing to consolidate a negative electrode active material layer, wherein the all-solid-state battery has a structure including a laminate of a positive electrode current collector layer, a positive electrode active material layer, a solid electrolyte layer, the negative electrode active material layer, and a negative electrode current collector layer in this order, the negative electrode active material layer includes a lithium-titanium oxide as a negative electrode active material, and prior to (before) the roll-pressing, a stress relaxation rate of ends of the negative electrode active material layer in a direction extending perpendicular to the lamination direction and along the direction of transfer by the roll-pressing is 32.5% or more.

In the production method of the present disclosure, the negative electrode active material layer may include VGCF in only ends thereof.

As a means for solving the above problems, the present application discloses:

an all-solid-state battery, having a structure including a laminate of a positive electrode current collector layer, a positive electrode active material layer, a solid electrolyte layer, a negative electrode active material layer, and a negative electrode current collector layer in this order, wherein the negative electrode active material layer includes a lithium-titanium oxide as a negative electrode active material, and the negative electrode active material layer includes VGCF in only ends in a direction perpendicular to the lamination direction.

According to the technology of the present disclosure, when a negative electrode active material layer including a lithium-titanium oxide is roll-pressed, cracking of the ends of the electrode can be suppressed.

BRIEF DESCRIPTION OF DRAWINGS

FIG. 3A is a schematic view showing an aspect of each of the steps when an all-solid-state battery is produced using the method of the present disclosure.

FIG. 3B is a schematic view showing an aspect of each of the steps when an all-solid-state battery is produced using the method of the present disclosure.

FIG. 3C is a schematic view showing an aspect of each of the steps when an all-solid-state battery is produced using the method of the present disclosure.

FIG. 3D is a schematic view showing an aspect of each of the steps when an all-solid-state battery is produced using the method of the present disclosure.

FIG. 3E is a schematic view showing an aspect of each of the steps when an all-solid-state battery is produced using the method of the present disclosure.

FIG. 3F is a schematic view showing an aspect of each of the steps when an all-solid-state battery is produced using the method of the present disclosure.

FIG. 3G is a schematic view showing an aspect of each of the steps when an all-solid-state battery is produced using the method of the present disclosure.

FIG. 3H is a schematic view showing an aspect of each of the steps when an all-solid-state battery is produced using the method of the present disclosure.

DESCRIPTION OF EMBODIMENTS

Figure 1:
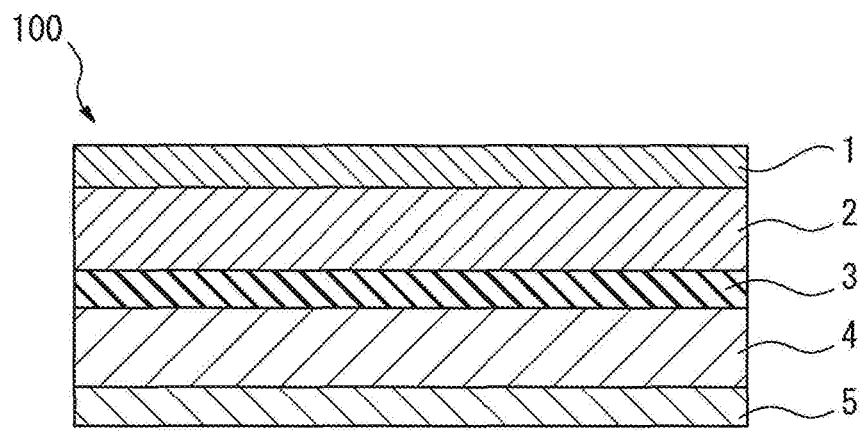
FIG. 1 is a schematic cross-sectional view showing an aspect of the structure of an all-solid-state battery.

The present disclosure will be described in detail below by way of the embodiments with reference to the drawings. For convenience of explanation, in the drawings, identical or corresponding portions have been assigned the same reference sign, and duplicate descriptions thereof have been omitted. Not all of the constituent elements of the embodiments are indispensable, and some of the constituent elements can be omitted in some cases. The forms illustrated in the drawings below are merely examples of the present disclosure. The present disclosure is not limited thereto.

1. All-Solid-State Battery Production Method (First Aspect)

The method for the production of an all-solid-state battery according to the present disclosure includes roll-pressing to consolidate a negative electrode active material layer, wherein the all-solid-state battery has a structure including a laminate of a positive electrode current collector layer, a positive electrode active material layer, a solid electrolyte layer, the negative electrode active material layer, and a negative electrode current collector layer in this order, the negative electrode active material layer includes a lithium-titanium oxide as a negative electrode active material, and prior to the roll-pressing, a stress relaxation rate of the negative electrode active material layer is 32.5% or more.

The all-solid-state battery has a structure including a laminate of a positive electrode current collector layer, a positive electrode active material layer, a solid electrolyte layer, a negative electrode active material layer, and a negative electrode current collector layer in this order.

For example, FIG. 1 is a schematic cross-sectional view showing an aspect of the structure of the all-solid-state battery.

The all-solid-state battery 100 shown in FIG. 1 has a structure including a laminate of a positive electrode current collector layer 1, a positive electrode active material layer 2, a solid electrolyte layer 3, a negative electrode active material layer 4, and a negative electrode current collector layer 5 in this order.

Figure 2:
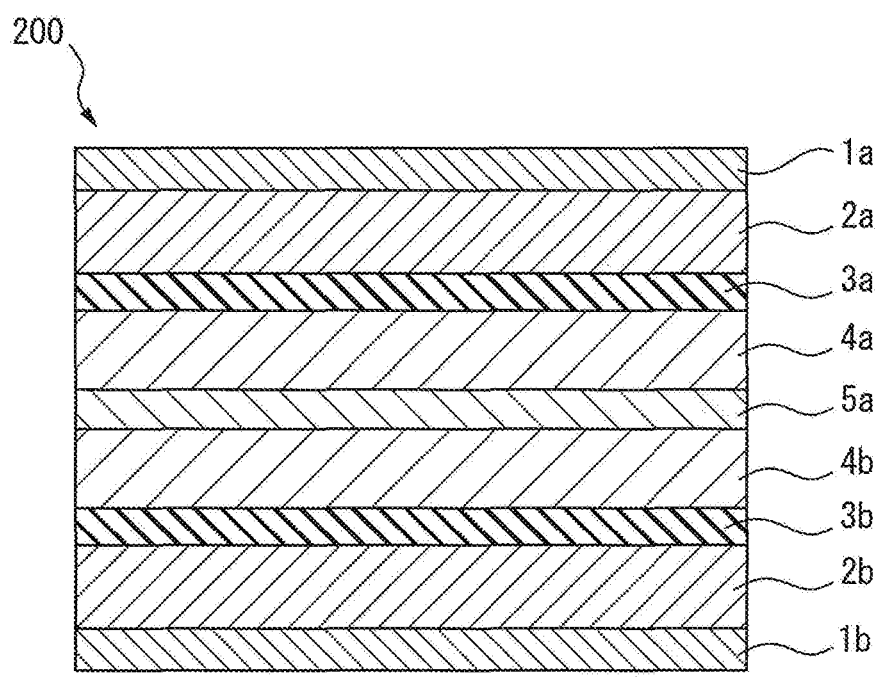
FIG. 2 is a schematic cross-sectional view showing another aspect of the structure of an all-solid-state battery.

Furthermore, FIG. 2 is a schematic cross-sectional view showing another aspect of the structure of the all-solid-state battery.

The all-solid-state battery 200 shown in FIG. 2 has a structure including a laminate of a positive electrode current collector layer 1a, a positive electrode active material layer 2a, a solid electrolyte layer 3a, a negative electrode active material layer 4a, a negative electrode current collector layer 5a, a negative electrode active material layer 4b, a solid electrolyte layer 3b, a positive electrode active material layer 2b, and a positive electrode current collector layer 1b in this order.

1.1 Negative Electrode Active Material Layer

The stress relaxation rate of the negative electrode active material layer prior to roll-pressing is 32.5% or more.

For example, the stress relaxation rate of the negative electrode active material layer prior to roll-pressing may be 32.5% or more, 33.0% or more, 33.5% or more, 34.0% or more, 34.5% or more, 35.0% or more, 35.5% or more, 36.0% or more, 36.5% or more, 37.0% or more, 37.5% or more, 38.0% or more, 38.5% or more, 39.0% or more, 39.5% or more, or 40.0% or more, and may be 80.0% or less, 70.0% or less, 60.0% or less, 50.0% or less, 40.0% or less, 35.0% or less, 34.0% or less, or 33.0% or less.

In the present disclosure, the phrase "stress relaxation rate" is an index of the adhesive force (force of mutual attraction) acting between the powder particles of the material included in the negative electrode active material layer. The adhesive force between powder particles of the material included in the negative electrode active material layer increases as the value of the stress relaxation rate increases. Thus, by increasing the adhesive force between powder particles of the material included in the negative electrode active material layer, cracking of the ends of the electrode can be suppressed during roll-pressing of the negative electrode active material layer.

It should be noted that the stress relaxation rate (R) is, for example, a value which can be determined by applying a uniaxial load (initial load value: $W_0$) to the powder of the material included in the negative electrode active material and holding for a predetermined time in a constant volume, and dividing the difference ($W_0-W_1$) between the initial load value ($W_0$) and the load value after the predetermined time ($W_1$) by the initial load value ($W_0$), as shown in formula (1) below:

$$\text{Stress Relaxation Rate } R=[(W_0-W_1)/W_0]\times100(\%) \quad \text{Formula (1)}$$

Specifically, in the present disclosure, in order to measure the stress relaxation rate of the negative electrode active material layer prior to roll-pressing, for example, 3.5 g of the materials constituting the negative electrode active material layer are placed into a cylinder having a diameter of 15 mm, a stress of 170 kPa is applied thereto with a piston, and thereafter the piston is held at this position. The stress relaxation rate of the negative electrode active material layer prior to roll-pressing can be measured from the value obtained by dividing the difference between the initial stress value and the stress value after 100 seconds by the initial stress value.

In the present disclosure, the method for ensuring that the stress relaxation rate of the negative electrode active material layer prior to roll-pressing is within the range described above is not particularly limited, and the desired stress relaxation rate can be achieved by, for example, adjusting the components contained in the negative electrode active material layer.

When, for example, a conductive aid, which is described later, is included in the negative electrode active material layer, by adjusting the relationship between the quantity of the conductive aid and the quantity of the lithium-titanium oxide included in the negative electrode active layer, a stress relaxation rate of the negative electrode active material prior to roll-pressing of 32.5% or more can be achieved.

More specifically, the quantity of the conductive aid included in the negative electrode active material layer relative to the quantity of the lithium-titanium oxide may be 2.4% by mass or more, 2.5% by mass or more, 2.6% by mass or more, 2.7% by mass or more, 2.8% by mass or more, 2.9% by mass or more, 3.0% by mass or more, 3.1% by mass or more, 3.2% by mass or more, 3.3% by mass or more, 3.4% by mass or more, 3.5% by mass or more, 3.6% by mass or more, 3.7% by mass or more, 3.8% by mass or more, 3.9% by mass or more, 4.0% by mass or more, 4.5% by mass or more, 4.8% by mass or more, or 5.0% by mass or more, and may be 6.0% by mass or less, 5.8% by mass or less, 5.5% by mass or less, 5.0% by mass or less, 4.5% by mass or less, 4.0% by mass or less, 3.5% by mass or less, 3.0% by mass or less, or 2.5% by mass or less.

Furthermore, in addition to the quantity of the conductive aid described above, by appropriately selecting the type of the conductive aid used, a stress relaxation rate of the negative electrode active material layer prior to roll-pressing of 32.5% or more can be achieved. In particular, when the negative electrode active material layer includes VGCF as the conductive aid, the stress relaxation rate of the negative electrode active material layer prior to roll-pressing can be more easily adjusted to 32.5% or more.

The thickness of the negative electrode active material layer is not particular limited, and may be, for example, 1 μm or more, 5 μm or more, 10 μm or more, 15 μm or more, or 20 μm or more, and may be 150 μm or less, 120 μm or less, 100 μm or less, or 50 μm or less.

The negative electrode active material layer according to the present disclosure is a layer including at least a negative electrode active material layer, and may include at least one of, for example, a solid electrolyte, a conductive aid, and a binder, as needed. Among these, from the viewpoint of ease of adjustment of the stress relaxation rate described above, a conductive aid may be further included in the negative electrode active material layer.

1.1.1 Negative Electrode Active Material

In the present disclosure, the negative electrode active material includes a lithium-titanium oxide.

Examples of the lithium-titanium oxide are not particularly limited, and a spinel-structure lithium-titanium oxide ($Li_{4+x}Ti_5O_{12}$ (0≤x≤3)) or a Ramsdellite-structure lithium-titanium oxide ($Li_{2+x}Ti_3O_7$ (0≤x≤3)) may be used. In embodiments, a spinel-structure lithium-titanium oxide may be used.

Though not limited thereto, $Li_4Ti_5O_{12}$ is a specific example of a spinel-structure lithium-titanium oxide.

Though not limited thereto, $Li_2Ti_3O_7$ is a specific example of a Ramsdellite-structure lithium-titanium oxide.

One type of lithium-titanium oxide may be used alone as the negative electrode active material layer, or two or more types may be used in combination.

Furthermore, as long as the effects of the present disclosure are not inhibited thereby, in addition to a lithium-titanium oxide, another negative electrode active material may be further included in the negative electrode active material layer.

The other negative electrode active material layer is not particularly limited, and examples thereof include alloy-based negative electrode active materials such as Si alloy-based negative electrode active materials and Sn alloy-based negative electrode active materials, or a carbon material such as hard carbon, soft carbon, or graphite.

When another negative electrode active material is further included, the content of the lithium-titanium oxide relative to the total quantity of the negative electrode active material may be 60% by mass or more, 70% by mass or more, 80% by mass or more, 90% by mass or more, or 95% by mass or more.

1.1.2 Solid Electrolyte

Though not limited thereto, examples of the solid electrolyte include sulfide solid electrolytes such as $Li_2S$—$P_2S_5$ ($Li_7P_3S_{11}$, $Li_3PS_4$, $Li_8P_2S_9$, etc.), $Li_2S$—$SiS_2$, $LiI$—$Li_2S$—$SiS_2$, $LiI$—$Li_2S$—$P_2S_5$, $LiI$—$LiBr$—$Li_2S$—$P_2S_5$, $Li_2S$—$P_2S_5$—$GeS_2$ ($LiI_3GeP_3S_{16}$, $Li_{10}GeP_2S_{12}$, etc.), $LiI$—$Li_2S$—$P_2O_5$, $LiI$—$Li_3PO_4$—$P_2S_5$, and $Li_{7-x}PS_{6-x}Cl_x$, oxide solid electrolytes such as $Li_7La_3Zr_2O_{12}$, $Li_{7-x}La_3Zr_{1-x}Nb_xO_{12}$, $Li_{7-3x}La_3Zr_2Al_xO_{12}$, $Li_{3x}La_{2/3-x}TiO_3$, $Li_{1+x}Al_xTi_{2-x}(PO_4)_3$, $Li_{1+x}Al_xGe_{2-x}(PO_4)_3$, $Li_3PO_4$, and $Li_{3+x}PO_{4-x}N_x$ (LiPON), as well as polymer electrolytes such as polyethylene oxide (PEO), and polypropylene oxide (PPO).

1.1.3 Conductive Aid

Though not limited thereto, examples of the conductive aid include carbon materials such as VGCF (Vapor Grown Carbon Fiber) and carbon nanofibers, as well as metal materials. In embodiments, the conductive aid may be VGCF.

1.1.4 Binder

Though not limited thereto, examples of the binder include polyvinylidene fluoride (PVdF), carboxymethylcellulose (CMC), butadiene rubber (BR), and styrene butadiene rubber (SBR).

1.2 Negative Electrode Current Collector Layer

The conductive material used in the negative electrode current collector layer is not particularly limited, and any material which can be used in all-solid-state batteries can be appropriately used. For example, though not limited thereto, the conductive material used in the negative electrode current collector layer may be SUS, aluminum, copper, nickel, iron, titanium, or carbon.

The form of the negative electrode current collector layer is not particularly limited, and can be, for example, a foil, plate, or mesh. In embodiments, the negative electrode current collector layer may be foil.

Furthermore, the negative electrode current collector layer may include a protrusion which protrudes in the surface direction. A negative electrode current collector tab may be electrically connected to this protrusion.

Furthermore, one surface or both surfaces of the negative electrode current collector layer may be covered with a conductive carbon.

The conductive carbon is not particularly limited, and examples thereof include carbon black (typically acetylene black, Ketjen black, or furnace black), activated carbon, graphite, carbon fibers, or carbon nanotubes.

Furthermore, these conductive carbons may be mixed with the binder. The binder is not particularly limited, and may be, for example, a material such as polyvinylidene fluoride (PVdF), carboxymethylcellulose (CMC), butadiene rubber (BR), or styrene butadiene rubber (SBR), or a combination thereof.

1.3 Positive Electrode Active Material Layer

The positive electrode active material layer is a layer which includes at least a positive electrode active material, and may include at least one of, for example, a solid electrolyte, a conductive aid, and a binder, as needed.

1.3.1 Positive Electrode Active Material

Though not limited thereto, examples of the positive electrode active material include lithium cobalt oxide ($LiCoO_2$), lithium nickel oxide ($LiNiO_2$), lithium manganate ($LiMn_2O_4$), $LiCo_{1/3}Ni_{1/3}Mn_{1/3}O_2$ or a heterogeneous-element-substituted Li—Mn spinel represented by $Li_{1+x}Mn_{2-x-y}M_yO_4$ (where M is at least one metal element selected from Al, Mg, Co, Fe, Ni and Zn).

1.3.2 Other Components

Regarding the solid electrolyte, conductive aid, and binder which may be included in the positive electrode active material layer, refer to the examples described above.

The thickness of the positive electrode active material layer is not particularly limited and may be, for example 1 m or more, 5 m or more, 10 m or more, 15 m or more, or 20 m or more, and may be 150 µm or less, 120 µm or less, 100 µm or less, or 50 µm or less.

1.4 Positive Electrode Current Collector Layer

The conductive material used in the positive electrode current collector layer is not particularly limited, and any material which can be used in all-solid-state batteries can appropriately be used. For example, though not limited thereto, the conductive material used in the positive electrode current collector layer may be SUS, aluminum, copper, nickel, iron, titanium, or carbon.

The form of the positive electrode current collector layer is not particularly limited, and can be, for example, a foil, plate, or mesh. In embodiments, the positive electrode current collector layer may be foil.

Furthermore, the positive electrode current collector layer may include a protrusion which protrudes in the surface direction. A positive electrode current collector tab may be electrically connected to this protrusion.

Furthermore, like the case of the negative electrode current collector layer described above, one or both surfaces of the positive electrode current collector layer may be covered with a conductive carbon.

1.5 Solid Electrolyte Layer

The solid electrolyte layer is a layer which includes at least a solid electrolyte, and may include, for example, a binder as needed. Note that regarding the solid electrolyte and binder, as needed, included in the solid electrolyte layer refer to the examples described above.

The thickness of the solid electrolyte layer is not particularly limited and may be, for example 0.1 µm or more, 0.5 µm or more, 1 µm or more, 5 µm or more, 10 µm or more, 15 m or more, or 20 µm or more, and may be 300 µm or less, 200 µm or less, 150 µm or less, 120 m or less, 100 µm or less, or 50 µm or less.

1.6 Aspect of Production Steps

The all-solid-state battery production method of the present disclosure includes roll-pressing to consolidate the negative electrode active material layer described above.

For example, FIG. 3 is a schematic view showing an aspect of steps (1) to (4) during production of the all-solid-state battery shown in FIG. 2 using the method of the present disclosure.

1.6.1 Step (1)

In step (1), a laminate to be consolidated by roll-pressing is provided.

When, for example, producing the all-solid-state battery 200 shown in FIG. 2, a laminate of the positive electrode active material layer 2a—the solid electrolyte layer 3a—the negative electrode active material layer 4a—the negative electrode current collector layer 5a—the negative electrode active material layer 4b—the solid electrolyte layer 3b—the positive electrode active material layer 2b (hereinafter referred to as the "laminate 10") may be provided as the laminate to be consolidated by roll-pressing.

The method for providing such a laminate 10 is not particularly limited, and the following steps (1-1) to (1-4) may be performed.

Step (1-1)

In step (1-1), positive electrode active material layers are formed on transfer substrates. For example, FIG. 3A illustrates an aspect in which the positive electrode active material layers $2a$ and $2b$ are formed on transfer substrates $1x$ and $1y$, respectively.

The method for forming the positive electrode active material layers on the transfer substrates is not particularly limited, and processes for the production of active material layers used in all-solid-state batteries can be appropriately referred to. For example, a transfer substrate-attached positive electrode active material layer can be formed by applying a slurry including the materials constituting the positive electrode active material layer to a transfer substrate, and thereafter drying.

Furthermore, the transfer substrate is not particularly limited, and may be a metal sheet or resin film.

Step (1-2)

In (1-2), negative electrode active material layers and solid electrolyte layers are formed in this order on the both surfaces of the negative electrode current collector layer.

For example, a slurry including the materials constituting the negative electrode active material layer is applied to both surfaces of the negative electrode current collector layer or to one surface of the negative electrode current collector layer at a time, and subsequently dried, whereby negative electrode active material layers can be formed on both surfaces of the negative electrode current collector layer. When forming the negative electrode active material layers, a step in which it is confirmed in advance whether the materials constituting the negative electrode active material layer satisfies the stress relaxation rate described above may be performed.

Further, by transferring the solid electrolyte layers formed on the transfer substrates onto both surfaces of the negative electrode active material layers formed on both surfaces of the negative electrode current collector layer, a laminate having a structure represented by "solid electrolyte layer-negative electrolyte active material layer-negative electrode current collector layer-negative electrode active material layer-solid electrolyte layer" can be formed.

For example, FIG. 3A shows an aspect of a laminate having a structure represented by "the solid electrolyte layer $3a$—the negative electrode active material layer $4a$—the negative electrode current collector layer $5a$—the negative electrode active material layer $4b$—the solid electrolyte layer $3b$".

Step (1-3)

In step (1-3), the transfer substrate-attached positive electrode active material layers formed in step (1-1) are affixed to the surfaces of the laminate having a structure represented by "solid electrolyte layer-negative electrode active material layer-negative electrode current collector layer-negative electrode active material layer-solid electrolyte layer" so that the positive electrode active material layers and the solid electrolyte layers are in direct contact, and are thereafter pressed. It should be noted that the pressing in this case may be planar pressing or may be roll-pressing.

For example, FIG. 3B shows an aspect of step (1-3).

Step (1-4)

In step (1-4), the transfer substrates of the positive electrode active material layers are removed, whereby the laminate to be consolidated by roll-pressing is obtained.

For example, FIG. 3C illustrates an aspect in which the transfer substrates $1x$ and $1y$ of the positive electrode active material layers $2a$ and $2b$ (FIG. 3A), respectively, are removed, whereby the laminate 10 to be consolidated by roll-pressing is obtained.

1.6.2 Step (2)

In step (2), the laminate to be consolidated by roll-pressing is roll-pressed to consolidate the negative electrode active material layer, the positive electrode active material layer, and the solid electrolyte layer included in the laminate.

For example, FIG. 3D shows an aspect of the roll-pressing of the laminate 10.

The roll-pressing may be performed using a well-known roll-press or the like.

The press pressure during roll-pressing is not particularly limited and may be, for example, 1 ton/cm or more, 2 ton/cm or more, 3 ton/cm or more, 4 ton/cm or more, 5 ton/cm or more, or 6 ton/cm or more, and may be 10 ton/cm or less, 8 ton/cm or less, 7 ton/cm or less, or 6 ton/cm or less.

The temperature during roll-pressing is not particularly limited and may be, for example, 50° C. or more, 100° C. or more, 120° C. or more, 150° C. or more, 170° C. or more, 190° C. or more, or 200° C. or more, and may be 250° C. or less, 230° C. or less, or 210° C. or less. Furthermore, the roll-pressing may be performed at room temperature.

1.6.3 Step (3)

In step (3), cutting is performed so that a protrusion is included on the negative electrode current collector layer. A negative electrode current collector tab may be electrically connected to this protrusion.

For example, FIG. 3E shows an aspect in which the negative electrode current collector layer $5a$ of the laminate 10 have been cut so as to include protrusions.

It should be noted that when the negative electrode current collector layer already has a protrusion or when a current collector tab is directly and electrically connected to the negative electrode current collector layer, step (3) may be omitted.

1.6.4 Step (4)

In step (4), the positive electrode current collector layers are affixed to the roll-pressed laminate.

The positive electrode current collector layers and the roll-pressed laminate may be bonded with an adhesive.

The adhesive is not particularly limited, and may be, for example, a binder such as polyvinylidene fluoride (PVdF), carboxymethylcellulose (CMC), butadiene rubber (BR), or styrene butadiene rubber (SBR), or may be a thermoplastic resin.

For example, FIG. 3F shows an aspect in which the positive electrode current collector layers $1a$ and $1b$ have been affixed to the roll-pressed laminate 10 with an adhesive 20.

By performing steps (1) to (4) in this manner, the all-solid-state battery 200 (FIGS. 3G and 3H) can be produced.

2. All-Solid-State Battery Production Method (Second Aspect)

According to the new knowledge of the present inventors, one cause of cracking of the ends of an electrode during roll-pressing is an extension in the width direction which occurs in the ends of the electrode. In other words, the key to suppressing end cracking is to suppress the extension in the width direction at the electrode end parts. In relation thereto, by increasing the stress relaxation rate of the negative electrode active material layer prior to roll-pressing as described above, the adhesiveness between materials in the negative electrode active material layer is enhanced, whereby elongation in the width direction in the ends of the electrode is suppressed during roll-pressing, and cracking in the ends of the electrode can be suppressed. According to the new knowledge of the present inventors, from the viewpoint of suppressing cracking in the ends of the electrode, it is not necessary to increase in the stress relaxation rate of the entirety of the negative electrode active material layer prior to roll-pressing, increasing the stress relaxation rate of at least the end parts of the negative electrode active material layer is sufficient.

In other words, the method for the production of an all-solid-state battery of the present disclosure according to a second aspect includes roll-pressing to consolidate a negative electrode active material layer, wherein the all-solid-state battery has a structure including a laminate of a positive electrode current collector layer, a positive electrode active material layer, a solid electrolyte layer, the negative electrode active material layer, and a negative electrode current collector layer in this order, the negative electrode active material layer includes a lithium-titanium oxide as a negative electrode active material, and prior to the roll-pressing, a stress relaxation rate of ends of the negative electrode active material layer in a direction extending perpendicular to the lamination direction and along the direction of transfer by the roll-pressing (the ends in the width direction of the negative electrode active material layer) is 32.5% or more.

Figure 4:
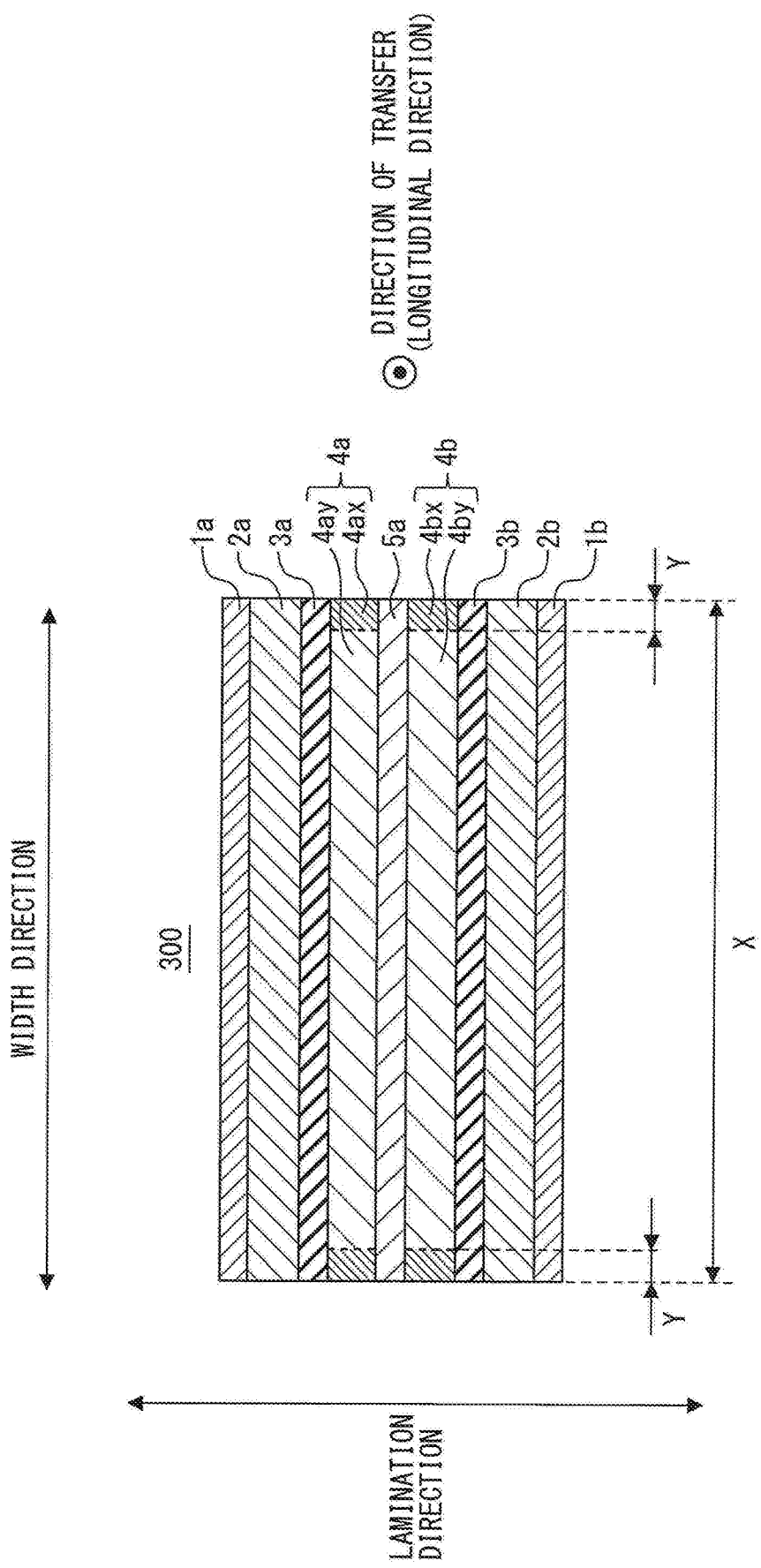
FIG. 4 is a cross-sectional schematic view showing another aspect of the structure of the all-solid-state battery according to the present disclosure.

Note that in the present application, the "ends" of the negative electrode active material layer refers to the portions of the negative electrode active material layer which satisfy the following relationship. That is, as shown in FIG. 4, when the width of the entirety of the negative electrode active material layer in the direction perpendicular to the lamination direction of the layers of the all-solid-state battery is defined as X (mm), and the width of the ends of the negative electrode active material layer is defined as Y (mm), the ratio Y/X of the width Y of the end parts to the width X of the entirety satisfies the relationship Y/X≤0.01. Alternatively, the width Y of the ends of the negative electrode active material layer described above may be, for example 10 mm or less, may be 8 mm or less, may be 5 mm or less, may be 3 mm or less, and may be 0.1 mm or more, may be 0.5 mm or more, may be 0.8 mm or more, and may be 1 mm or more.

FIG. 4 shows an example of an all-solid-state battery produced by the method according to the second aspect. In the all-solid-state battery 300 shown in FIG. 4, it is sufficient that the ends 4ax, 4bx of the electrode active material layers 4a, 4b prior to roll-pressing satisfy a desired stress relaxation rate, and the other structures thereof (the structures of portions 4ay, 4by other than the ends of the negative electrode active material layer, the structure of the negative electrode current collector layer 5a, the structures of the solid electrolyte layers 3a, 3b, the structures of the positive electrode active material layers 2a, 2b, and the structures of the positive electrode current collector layers 1a, 1b) may be identical to those of the first aspect. Though FIG. 4 shows a form in which the layers are laminated on both surfaces of the negative electrode current collector layer, the layers may be laminated on only one surface of the negative electrode current collector layer as shown in FIG. 1. A detailed description of the second aspect, other than the specific structure of the negative electrode active material layer, has been omitted below.

2.1 Negative Electrode Active Material Layer

The stress relaxation rate of the ends of the negative electrode active material layer prior to roll-pressing may be 32.5% or more, 33.0% or more, 33.5% or more, 34.0% or more, 34.5% or more, 35.0% or more, 35.5% or more, 36.0% or more, 36.5% or more, 37.0% or more, 37.5% or more, 38.0% or more, 38.5% or more, 39.0% or more, 39.5% or more, or 40.0% or more, and may be 80.0% or less, 70.0% or less, 60.0% or less, 50.0% or less, 40.0% or less, 35.0% or less, 34.0% or less, or 33.0% or less.

In the method according to the second aspect, it is sufficient that the stress relaxation rate of the ends of the negative electrode active material layer prior to roll pressing be 32.5% or more, and the stress relaxation rate of the portion excluding the ends (the central portion) may be 32.5% or more, or may be less than 32.5%.

The method for ensuring that the stress relaxation rate of the ends of the negative electrode active material layer prior to roll-pressing is not particularly limited, and may be achieved by, for example, adjusting the components included in the ends of the negative electrode active material layer.

For example, when VGCF is included in the negative electrode active material layer, by adjusting the content of the VGCF, the stress relaxation rate of the negative electrode active material layer prior to roll-pressing can be easily adjusted, and cracking of the ends of the electrode can be further suppressed. According to the new knowledge of the present inventors, when VGCF is included in only the ends of the negative electrode active material layer, in addition to ensuring a desired stress relaxation rate and suppressing edge cracking, the resistance of the battery can be reduced as compared to the case in which VGCF is included in the entirety of the negative electrode active material layer.

In other words, in the method according to the second aspect, VGCF may be included in, for example, only the ends of the negative electrode active material layer. In this case, the portion (central portion) of the negative electrode active material layer which does not include VGCF and may or may not include a conductive aid other than VGCF.

2.2 Aspect of Production Steps

In the method according to the second aspect, as described above, the stress relaxation rate of the ends of the negative electrode active material layer prior to roll-pressing is set to 32.5% or more. The specific production steps for achieving this relaxation rate are described below.

Figure 5:
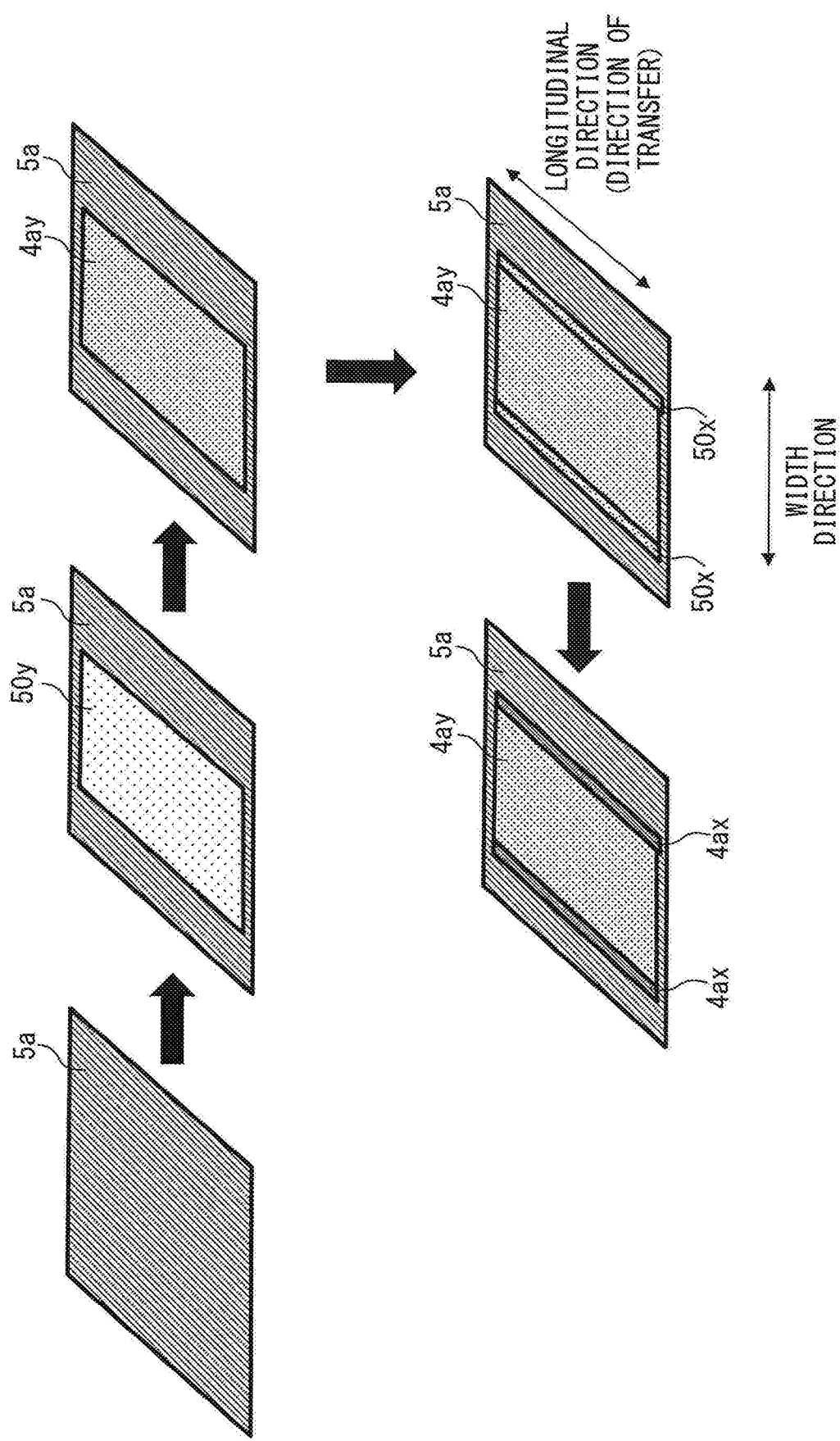
FIG. 5 is a schematic view showing another aspect of production steps of a negative electrode active material layer.

For example, as shown in FIG. 5, a slurry 50y including the materials constituting a portion 4ay other than the ends of the negative electrode active material layer 4a is applied to the surface (both surfaces or one surface) of the negative electrode current collector 5a and dried. The first slurry 50a may, for example, not include VGCF. As a result, the negative electrode active material layer 4ay, which does not include VGCF, can be formed on, for example, the surface of the negative electrode current collector layer 5a. A slurry 50x including the materials constituting the ends 4ax of the negative electrode active material layer 4a is applied to the surface (both surfaces or one surface) of the negative electrode current collector layer 5a at a predetermined width along the outer edge extending in the longitudinal direction (the direction of transfer of the roll-pressing) of the negative electrode active material layer 4ay, and dried. The slurry 50x may, for example, include VGCF. As a result, the ends 4ax having a predetermined width and including VGCF can be formed at, for example, positions adjacent to the outer edges of the negative electrode active material layer 4ay. It should be noted that in consideration of production efficiency, the application of the first slurry 50a and the second slurry 50b may be performed simultaneously. Furthermore, when forming the ends 4ax, a step for confirming whether the materials constituting the ends 4ax satisfy the stress relaxation rate may be performed in advance.

Regarding steps other than the formation of the negative electrode active material layers, refer to, for example, steps (1) to (4) described regarding the first aspect.

3. All-Solid-State-Battery

The technology of the present disclosure includes an aspect of an "all-solid-state battery" in addition to the "production method of an all-solid-state battery" described above. That is, the all-solid-state battery according to the present disclosure has a structure including a laminate of positive electrode current collector layer, a positive electrode active material layer, a solid electrolyte layer, a negative electrode active material layer, and a negative electrode current collector layer in this order, wherein the negative electrode active material layer includes a lithium-titanium oxide as a negative electrode active material, and the negative electrode active material layer includes VGCF only at the ends in a direction perpendicular to the lamination direction. In the all-solid-state battery of the present disclosure, the "ends" of the negative electrode active material may be the ends which extend along the longitudinal direction (the direction perpendicular to the width direction) of the negative electrode active material layer when the negative electrode active material layer has a rectangular surface shape including a predetermined width and length in a plan view as shown in FIGS. 4 and 5. In this case, VGCF may be included in the entirety of the extending ends (across the extending ends).

As described above, in the all-solid-state battery, when the negative electrode active material layer includes VGCF, cracking of the ends of the electrode can be suppressed as compared to the case in which VGCF is not included. Furthermore, in the all-solid-state battery, when VGCF is included in only the ends of the negative electrode active material layer, in addition to a suppression of cracking of the ends, the resistance of the battery can be reduced as compared to the case in which VGCF is included in the entirety of the negative electrode active material layer.

The forms of the negative electrode active material layer, the negative electrode current collector layer, the positive electrode active material layer, the positive electrode current collector layer, and the solid electrolyte layer included in the all-solid-state battery of the present disclosure have already been described, and a detailed description thereof has been omitted. Furthermore, the other structures (terminals, battery case, etc.) can be included in the all-solid-state battery, and a detailed description thereof has been omitted.

EXAMPLES

1. Regarding End Cracking

Example 1

Step (1)

A slurry including the materials constituting the positive electrode active material layer was applied to a transfer substrate (aluminum foil) and dried, whereby a transfer substrate-attached positive electrode active material layer was formed.

Furthermore, a slurry including the materials constituting the solid electrolyte layer was applied to a transfer substrate (aluminum foil) and dried, whereby a transfer substrate-attached solid electrolyte layer was formed.

A slurry including the materials constituting the negative electrode active material layer was applied to both surfaces of a negative electrode current collector layer (copper foil) and dried, whereby negative electrode active material layers were formed on both surfaces of the negative electrode current collector layer.

A lithium-titanium oxide as the negative electrode active material, a solid electrolyte identical to the solid electrolyte included in the solid electrolyte layer, VGCF (Vapor Grown Carbon Fiber) as the conductive aid, and a binder were used as the materials constituting the negative electrode active material layer. Furthermore, the quantity of the conductive aid (VGCF) included in the negative electrode active material layer was 2.4% by mass relative to the quantity of the lithium-titanium oxide.

Furthermore, in order to measure the stress relaxation rate of the negative electrode active material layer prior to roll-pressing, 3.5 g of the materials constituting the negative electrode active material layer were placed in a cylinder having a diameter of 15 mm, a stress of 170 kPa was applied with a piston, and the piston was held at this position. From the value obtained by dividing the difference between the initial stress value and the stress value after 100 seconds by the initial stress value, it was confirmed that the stress relaxation rate of the negative electrode active material layer prior to roll-pressing was 32.5%.

The solid electrolyte layers formed on transfer substrates were affixed to the surfaces of the negative electrode active material layers formed on both surfaces of the negative electrode current collector layer, whereby a "solid electrolyte layer-negative electrode active material layer-negative electrode current collector layer-negative electrode active material layer-solid electrolyte layer" laminate was formed.

Next, the transfer substrate-attached positive electrode active material layers were affixed to the surfaces of the "solid electrolyte layer-negative electrode active material layer-negative electrode current collector layer-negative electrode active material layer-solid electrolyte layer" laminate so that the positive electrode active material layers and the solid electrolyte layers were in direct contact, and pressed at a pressure of 1 ton/cm$^2$ Finally, the transfer substrates were removed from the positive electrode active material layers, whereby a "positive electrode active material layer-solid electrolyte layer-negative electrode active material layer-negative electrode current collector layer-negative electrode active material layer-solid electrolyte layer-positive electrode active material layer" laminate to be consolidated by roll-pressing was obtained.

Step (2)

The "positive electrode active material layer-solid electrolyte layer-negative electrode active material layer-negative electrode current collector layer-negative electrode active material layer-solid electrolyte layer-positive electrode active material layer" laminate obtained in step 1 described above was subjected to roll-pressing at a pressure of 4 ton/cm while being heated to 170° C.

Step (3)

The negative electrode current collector layer was cut so as to have a protrusion.

The all-solid-state battery of Example 1 was produced by affixing, using a binder, positive electrode current collector layers (aluminum foils coated with a binder and carbon black particles), which were covered with the conductive carbon, to the surfaces of the laminate produced in step (3).

Example 2

The all-solid-state battery of Example 2 was produced in the same manner as Example 1 except that the quantity of the conductive aid included in the negative electrode active material layer was 4.8% by mass relative to the quantity of the lithium-titanium oxide.

It should be noted that in Example 2, the stress relaxation rate of the negative electrode active material layer prior to roll-pressing was 34.1%.

Comparative Example 1

The all-solid-state battery of Comparative Example 1 was produced in the same manner as Example 1 except that a conductive aid was not added to the negative electrode active material layer.

In Comparative Example 1, the stress relaxation rate of the negative electrode active material layer prior to roll-pressing was 28.9%.

Comparative Example 2

The all-solid-state battery of Comparative Example 2 was produced in the same manner as Example 1 except that the quantity of the conductive aid included in the negative electrode active material layer was 1.2% by mass relative to the quantity of the lithium-titanium oxide.

In Comparative Example 2, the stress relaxation rate of the negative electrode active material layer prior to roll-pressing was 30.9%.

Comparative Example 3

The all-solid-state battery of Comparative Example 3 was produced in the same manner as Example 1 except that acetylene black HS-100 was used as the conductive aid.

In Comparative Example 3, the stress relaxation rate of the negative electrode active material layer prior to roll-pressing was 28.7%.

<<Evaluation>>

It was visually confirmed whether or not cracking had occurred in the ends of the electrodes produced in Examples 1 and 2 and Comparative Examples 1 to 3 described above. The results are shown in Table 1.

TABLE 1

| | | Ex 1 | Ex 2 | Comp Ex 1 | Comp Ex 2 | Comp Ex 3 |
|---|---|---|---|---|---|---|
| Conductive Aid | Type | VGCF | VGCF | — | VGCF | HS-100 |
| | Quantity*[1] (mass %) | 2.4 | 4.8 | 0 | 1.2 | 2.4 |
| Stress Relaxation Rate (%) | | 32.5 | 34.1 | 28.9 | 30.9 | 28.7 |
| Cracking of Ends of Electrode | | Absent | Absent | Present | Present | Present |

*[1]The quantity of the conductive aid is a mass % relative to the quantity of the negative electrode active material As can be understood from Table 1, cracking occurred in the ends of the electrodes of all of Comparative Examples 1 to 3, in which the stress relaxation rates of the negative electrode active material layers prior to roll-pressing were less than 32.5%.

In contrast, cracking did not occur in the ends of the electrodes of both Examples 1 and 2, in which the stress relaxation rates of the negative electrode active material layers prior to roll-pressing were 32.5% or more.

According to the new knowledge of the present inventors, one of the causes of cracking of the ends of the electrodes is elongation in the width direction (the direction perpendicular to the direction of transfer during roll-pressing) of the ends of the electrode. In particular, end cracking is likely to occur in regions within 1 to 2 mm from the ends of the electrode. Taking this and the results of Examples 1 and 2 above into consideration, it is believed that as long as the stress relaxation rate of the ends of the negative electrode active material layer in the width direction is increased, the end cracking described above can be suppressed, and the stress relaxation rate of the portion (center portion) other than the ends of the negative electrode active material layer is not particularly limited. Examples are shown below.

Example 3

Step (1)

Transfer substrate-attached positive electrode active material layers were formed in the same manner as Example 1. Furthermore, transfer substrate-attached solid electrolyte layers were formed in the same manner as Example 1.

A slurry including the materials constituting the central portions of the negative electrode active material layers was applied to the surfaces of a negative electrode current collector layer (copper foil) and dried, whereby the central portions of the negative electrode active material layers were formed on the surfaces of the negative electrode current collector layer.

A lithium-titanium oxide as the negative electrode active material, a solid electrolyte identical to the solid electrolyte included in the solid electrolyte layer, and a binder were used as the materials constituting the negative electrode active material layer, and VGCF was not included.

A slurry including the materials constituting the ends of the negative electrode active material layers was applied at a width of 3 mm along the outer edges extending in the longitudinal direction (the direction of transfer of the roll-pressing) of the central portions of the negative electrode active material layers formed as described above, and dried. As a result, the ends of the negative electrode active materials were formed at a width of 3 mm along the outer edges of the central portions of the negative electrode active material layers.

A lithium-titanium oxide as the negative electrode active material, a solid electrolyte identical to the solid electrolyte included in the solid electrolyte layer, VGCF as the conductive aid, and a binder were used as the materials constituting the ends of the negative electrode active material layer. Furthermore, the quantity of the conductive aid (VGCF) included in the ends was 2.4% by mass relative to the quantity of the lithium-titanium oxide. The stress relaxation rate of the materials constituting the ends described above was 32.5%.

The obtained positive electrode active material layers, solid electrolyte layers, negative electrolyte active material layers, and negative electrode current collector layer were laminated in the same manner as Example 1, and an all-solid-state battery was produced under the same conditions as Example 1. Cracking of the ends of the negative electrode of the produced all-solid-state battery was not recognized.

2. Regarding Battery Resistance

Figure 6:
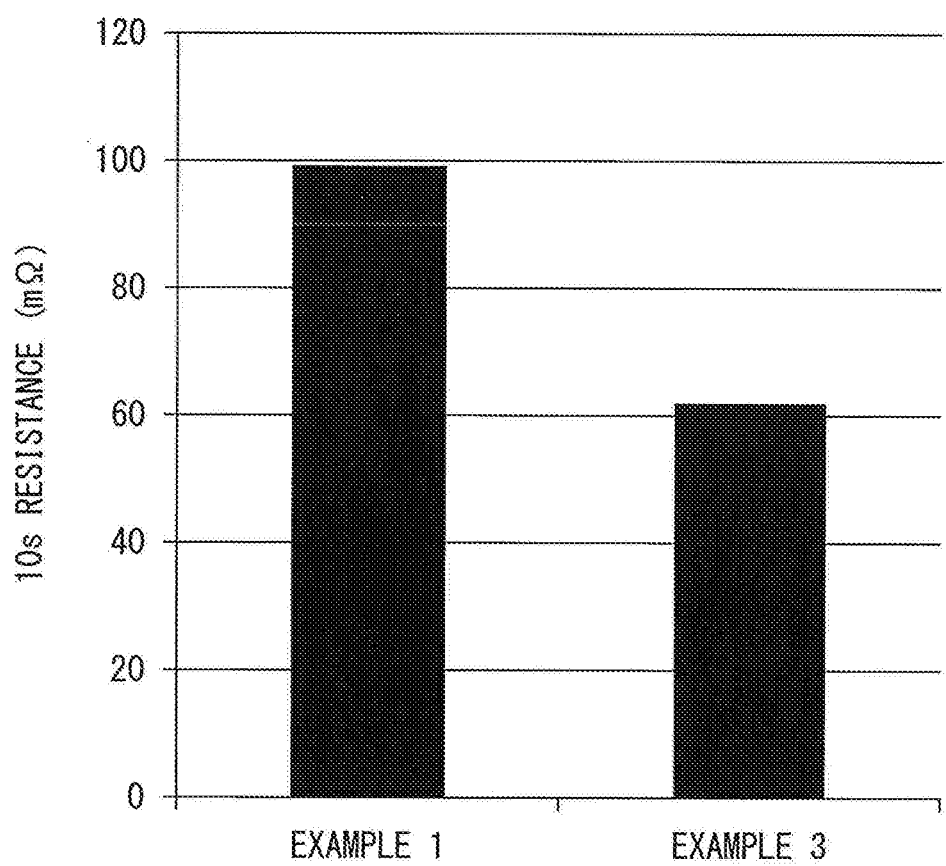
FIG. 6 shows a comparison of the ten-second resistance of the all-solid-state battery according to Example 1 and the ten-second resistance of the all-solid-state battery according to Example 3.

In Example 3, the quantity of VGCF in the entirety of the negative electrode active material layers could be reduced as compared with Example 1. As a result, the resistance of the battery could be reduced. FIG. 6 shows the results when ten-second resistance of each of the all-solid-state battery according to Example 1 and the all-solid-state battery according to Example 3 were measured.

As shown in FIG. 6, in the negative electrode active material layers, for the case in which VGCF was included in only the ends (Example 3), the ten-second resistance of the battery could be reduced by approximately 40% as compared to the case in which VGCF was included in the entirety of the negative electrode active material layers (Example 1).

REFERENCE SIGNS LIST 1, 1a, 1b positive electrode current collector layer
2, 2a, 2b positive electrode active material layer
3, 3a, 3b solid electrolyte layer
4, 4a, 4b negative electrode active material layer
5, 5a negative electrode current collector layer
100, 200, 300 all-solid-state battery

The invention claimed is:

1. A production method of an all-solid-state battery, comprising roll-pressing to consolidate a negative electrode active material layer; wherein
the all-solid-state battery has a structure comprising a positive electrode current collector layer, a positive electrode active material layer, a solid electrolyte layer, the negative electrode active material layer, and a negative electrode current collector layer in this order;
the negative electrode active material layer includes a lithium-titanium oxide as a negative electrode active material;
the negative electrode active material layer further includes a solid electrolyte and a conductive aid, wherein the quantity of the conductive aid included in the negative electrode active material layer relative to the quantity of the lithium-titanium oxide is 2.4% by mass or more and 6.0% by mass or less, and the conductive aid comprises vapor grown carbon fiber;
prior to the roll-pressing, a stress relaxation rate of the negative electrode active material layer is 32.5% or more; and
the roll-pressing is performed on a laminate, the laminate including the positive electrode active material layer, the solid electrolyte layer, the negative electrode active material layer, the negative electrode current collector layer, the negative electrode active material layer, the solid electrolyte layer, and the positive electrode active material layer in this order.

2. The production method of claim 1, wherein the solid electrolyte included in the negative electrode active material comprises a sulfide solid electrolyte.

3. A production method of an all-solid-state battery, comprising roll-pressing to consolidate a negative electrode active material layer; wherein
the all-solid-state battery has a structure comprising a positive electrode current collector layer, a positive electrode active material layer, a solid electrolyte layer, the negative electrode active material layer, and a negative electrode current collector layer in this order;
the negative electrode active material layer includes a lithium-titanium oxide as a negative electrode active material;
the negative electrode active material layer further includes a solid electrolyte and a conductive aid, wherein the quantity of the conductive aid included in the negative electrode active material layer relative to the quantity of the lithium-titanium oxide is 2.4% by mass or more and 6.0% by mass or less, and the conductive aid comprises vapor grown carbon fiber (VGCF);
prior to the roll-pressing, a stress relaxation rate of ends of the negative electrode active material layer in a direction extending perpendicular to the lamination direction and along the direction of transfer by the roll-pressing is 32.5% or more; and
the roll-pressing is performed on a laminate, the laminate including the positive electrode active material layer, the solid electrolyte layer, the negative electrode active material layer, the negative electrode current collector layer, the negative electrode active material layer, the solid electrolyte layer, and the positive electrode active material layer in this order.

4. The production method according to claim 3, wherein the negative electrode active material layer includes VGCF in only ends thereof.

* * * * *